United States Patent
Basu et al.

(10) Patent No.: US 12,270,965 B2
(45) Date of Patent: Apr. 8, 2025

(54) INTELLIGENT EXECUTION OF COMPUTE INTENSIVE NUMERICAL SIMULATION MODELS

(71) Applicant: INTERNATIONAL BUSINESS MACHINES CORPORATION, Armonk, NY (US)

(72) Inventors: Saurav Basu, Bengaluru (IN); Lloyd A. Treinish, Cortlandt Manor, NY (US); Mukul Tewari, Lafayette, CO (US); Sushain Pandit, Austin, TX (US); Jitendra Singh, Noida (IN)

(73) Assignee: International Business Machines Corporation, Armonk, NY (US)

( * ) Notice: Subject to any disclaimer, the term of this patent is extended or adjusted under 35 U.S.C. 154(b) by 465 days.

(21) Appl. No.: 17/663,552

(22) Filed: May 16, 2022

(65) Prior Publication Data
US 2023/0367034 A1    Nov. 16, 2023

(51) Int. Cl.
*G01W 1/10*    (2006.01)
*G06N 20/00*   (2019.01)

(52) U.S. Cl.
CPC .............. *G01W 1/10* (2013.01); *G06N 20/00* (2019.01)

(58) Field of Classification Search
CPC .......... G06N 20/00; G06N 3/047; G06N 7/01; G06N 3/084; G06N 3/0475; G06N 3/0455; G06N 3/04; G01W 1/10; H04W 4/90

See application file for complete search history.

(56) References Cited

U.S. PATENT DOCUMENTS

| 10,318,558 B2 | 6/2019 | Cipriani |
| 10,871,594 B2 * | 12/2020 | Tocornal ................. G01W 1/10 |
| 2020/0184494 A1 | 6/2020 | Joseph |
| 2020/0242483 A1 | 7/2020 | Shashikant Rao |

OTHER PUBLICATIONS

"Accurate Weather Forecasting Data", The Weather Company, Printed Mar. 1, 2022, 10 pages, <https://www.ibm.com/weather/industries/cross-industry/graf>.
"Adaptive learning numerical weather forecasting model", An IP.com Prior Art Database Technical Disclosure, Original Publication Date: Oct. 10, 2001, IP.com No. IPCOM000015255D, IP.com Electronic Publication Date: Jun. 20, 2003, 9 pages.
"Analytics Platform for Numerical Weather Prediction", An IP.com Prior Art Database Technical Disclosure, IP.com No. IPCOM000236327D, IP.com Electronic Publication Date: Apr. 21, 2014, 5 pages.

(Continued)

*Primary Examiner* — An H Do
(74) *Attorney, Agent, or Firm* — Gavin Giraud (57) ABSTRACT

In a method for intelligently executing predictive simulator, a processor may input a previous input vector of conditions for a predictive simulator collected at a first time into a machine-learning (ML) model. A processor may input a current input vector of conditions for the predictive simulator collected at a second time into the ML model. A processor may determine using the ML model, a binary similarity index. The binary similarity index represents a prediction of similarity between a first output from the predictive simulator based on the previous input and a second output from the predictive simulator based on the current input.

20 Claims, 5 Drawing Sheets

(56) References Cited

OTHER PUBLICATIONS

Doeswijk et al., "Adaptive Weather Forecasting using Local Meteorological Information", Biosystems Engineering, 91 (4), 2005, pp. 421-431, <http://www.leg.ufpr.br/~eder/Artigos/Bias/Doeswijk_2005.pdf>.

Droegemeir et al., "Dynamically Adaptive Numerical Weather Prediction: Models, Observations and Cyberinfrastructure Responding to the Atmosphere", Proceedings of the 23rd Conference on Atmospheric Chemistry (Virtually Held), Jan. 10-15, 2021, 12pages, <https://ams.confex.com/ams/pdfpapers/153549.pdf>.

Ingolfsson et al., "Bridging the Scales: A Machine Learning Directed Macro to Micro Scale Simulation to Model RAS Initiation of Cancer", Biophysical Journal, vol. 116, Issue 3, Supplement 1, 304A, Feb. 15, 2019, 8 pages, <https://doi.org/10.1016/j.bpj.2018.11.1649>.

Lee et al., "Down-Selecting Numerical Weather Prediction Multi-Physics Ensembles with Hierarchical Cluster Analysis", Journal of Climatology & Weather Forecasting, vol. 4, Issue 1, 2016, 16 pages, <https://www.iomcworld.com/abstract/downselecting-numerical-weather-prediction-multiphysics-ensembleswith-hierarchical-cluster-analysis-23215.html>.

Raissi, Maziar, "Deep Hidden Physics Models: Deep Learning of Nonlinear Partial Differential Equations", Journal of Machine Learning Research, vol. 19, 2018, pp. 1-24, <http://www.jmlr.org/papers/volume19/18-046/18-046.pdf>.

\* cited by examiner

INTELLIGENT EXECUTION OF COMPUTE INTENSIVE NUMERICAL SIMULATION MODELS

BACKGROUND

The present invention relates generally to the field of predictive simulation, and more particularly to intelligently executing simulation models.

Prediction and simulation models analyze patterns in historical data, and/or determine patterns from theoretical considerations, and associate those patterns with specific outcomes. Such models can utilize the logical connection associated with artificial intelligence to detect learned patterns in new data, and use them to predict future outcomes. For example, weather forecasting may use simulation models to predict the state of the atmosphere at a future time and a specified location. Traditionally, this has been done by modeling the atmosphere through physical simulations. Atmospheric or terrestrial conditions are observed and analyzed to create initial conditions, and a prediction is computed by numerically solving physical equations (e.g., fluid dynamics, thermodynamics) from that state. Similar numerical simulation models are used in many domains (i.e., based upon PDE solvers). Other example includes simulations of air flow and structural integrity for the design of automobiles and aircraft, or the chemical properties associated with complex molecules. Many such models are compute-intensive and run frequently in an operational manner (e.g., to generate weather forecasts). Machine learning has been used as a post-process to such numerical simulations and as a proxy for a subset of physical processes being physically simulated. Therefore, machine learning may represent a viable alternative to physical models used in weather forecasting.

Whether numerical or machine learning systems are used, the systems are typically executed at fixed time intervals in an operational or production fashion. For example, a system may be executed every few days, weeks, or months for long-term weather or seasonal forecasts, or every hour or day for short-term weather forecasts. These systems can range from global to highly localized (e.g., one city). The highly localized systems can have finer spatial scale than the more global systems.

SUMMARY

According to one embodiment of the present invention, a computer-implemented method, a computer program product, and a computer system are provided for intelligently executing predictive simulator. A processor may input a previous input vector of conditions for a predictive simulator collected at a first time into a machine-learning (ML) model. A processor may also input a current input vector of conditions for the predictive simulator collected at a second time into the ML model. A processor may determine using the ML model, a binary similarity index. The binary similarity index represents a prediction of similarity between a first output from the predictive simulator based on the previous input and a second output from the predictive simulator based on the current input.

DETAILED DESCRIPTION

Embodiments disclosed herein provide systems and methods for intelligently executing predictive simulators. An intelligent approach to predictive simulators means that the models disclosed herein detect conditions under which executing the predictive simulator will not provide a significant benefit. For example, if the prediction results would be similar to a previous execution, the current execution of the predictive simulator would not provide a significant benefit. This intelligent approach may be applied in weather prediction, which often assembles forecasts generated from several model runs with varying physics options, input and boundary conditions, or sliding time windows. These ensembles can lead to multi-fold increase in computational requirements. Such ensemble techniques are used with a diversity of earth, space and environmental models as well as in other physics, chemistry and engineering disciplines.

Figure 1:
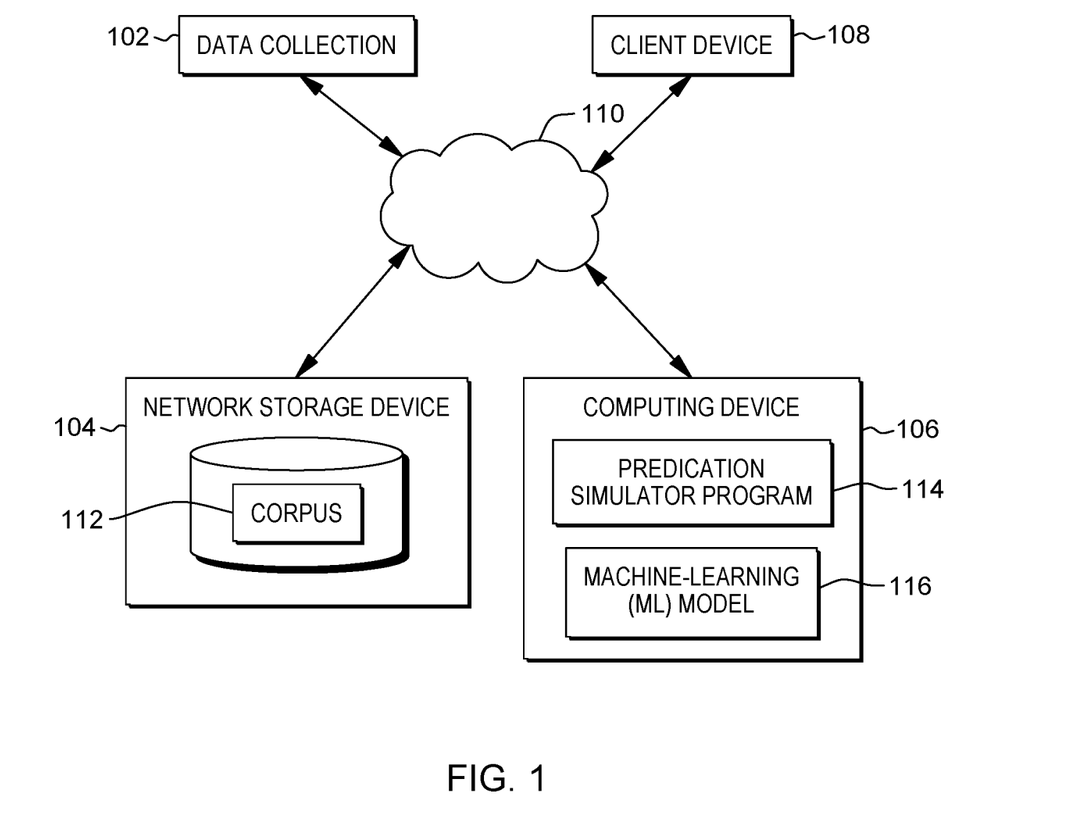
FIG. 1 is a functional block diagram illustrating a weather modeling environment, in accordance with an embodiment of the present invention.

FIG. 1 depicts a functional block diagram illustrating a weather modeling environment 100, in accordance with one embodiment of the present invention. FIG. 1 provides only an illustration of one implementation and does not imply any limitations regarding the environments in which different embodiments may be implemented. Many modifications to the depicted environment may be made by those skilled in the art without departing from the scope of the invention as cited by the claims.

The weather modeling environment 100 includes a data collection device 102, a network storage device 104, a computing device 106, and a client device 108 connected over a network 110. The network 110 can be, for example, a telecommunications network, a local area network (LAN), a wide area network (WAN), such as the Internet, or a combination of the three, and can include wired, wireless, or fiber optic connections. The network 110 can include one or more wired and/or wireless networks that are capable of receiving and transmitting data, voice, and/or video signals, including multimedia signals that include voice, data, and video information. In general, the network 110 can be any combination of connections and protocols that will support communications between the network storage device 104, and other computing devices (not shown) within the weather modeling environment 100. In various embodiments, the network 110 operates locally via wired, wireless, or optical connections and can be any combination of connections and protocols (e.g., personal area network (PAN), near field communication (NFC), laser, infrared, ultrasonic).

The network storage device 104 can be a standalone computing device, a management server, a web server, a mobile computing device, or any other electronic device or computing system capable of receiving, sending, and processing data. In other embodiments, the network storage device 104 can represent a server computing system utilizing multiple computers as a server system, such as in a cloud computing environment. In another embodiment, the network storage device 104 can be a laptop computer, a tablet computer, a netbook computer, a personal computer (PC), a desktop computer, a personal digital assistant (PDA), a smart phone, or any programmable electronic device capable of communicating with other computing devices (not shown) within the weather modeling environment 100 via the network 110. In another embodiment, the network storage device 104 represents a computing system utilizing connected computers and components (e.g., database server computers, application server computers, etc.) that act as a single pool of seamless resources when accessed within the computational environment 100. In the depicted embodiment, the network storage device 104 includes a corpus 112 containing data sets, data points, or other information captured by the data collection device 104 (or many data collection devices 104). In other embodiments, the network storage device 104 may contain other applications, databases, programs, etc. which have not been depicted in the weather modeling environment 100. The network storage device 104 may include internal and external hardware components, as depicted and described in further detail with respect to FIG. 5.

The corpus 112 is a repository for data used by the weather modeling environment 100. In the depicted embodiment, the corpus 112 resides on the network storage device 104. In another embodiment, the corpus 112 may reside elsewhere within the weather modeling environment 100, as long as the computing device 106, the data collection device(s) 104, and the client device 108 have access to the corpus 112. In certain embodiments, the corpus 112 stores a data stream, such as sets of training data, data structures, and/or variables used to fit the parameters of a specified model.

The corpus 112 may include data collected by the data collection device 102. The data collection device 102 may include remotely sensed or in situ observations (e.g., ground-based, airborne, orbiting systems, among others). This data stream may be continually updated with environmental data such as observations of precipitation, wind velocity, temperature, etc.

The computing device 106 includes a predictive simulator program 114 that receives data from the corpus 112, and forecasts weather and other environmental conditions. The predictive simulator program 114 includes environmental models such as air pollution forecasting models, land surface models, hydrological models, and hydrodynamic models, which predict future events (e.g., weather patterns, ocean currents, biological phenomena, or other natural processes) based on data in the corpus 112. The predictive simulator program 114 may include algorithms and models that are very compute-intensive, often driven by the output of numerical weather prediction (one or two-way coupled). The predictive simulator program 114 may be very costly to run/execute and may require high performance computing systems to generate forecasts within an acceptable time frame (i.e., sufficiently fast to enable the results to be useful for making a decision). In addition, the predictive simulator program 114 can suffer from latency in availability of input data and in dissemination of output. An example of a typical practice is that the predictive simulator program 114 should take no more than one hour to compute each day-ahead forecast.

The computing device 106, therefore, includes a machine-learning (ML) model trainer 116 to intelligently run/execute the predictive simulator program 114. Intelligently, as used in this application, refers to a machine-generated decision (learned from previous model runs and their forecasted outputs) to "run or not to run a model" by determining whether the current run of the predictive simulator program 114 will lead to significant differences in forecast results when compared to previous model runs of the predictive simulator program 114. Such intelligent and adaptive execution of the predictive simulator program 114 saves computational costs and reduces energy usage required to support such workloads. The associated savings lowers costs and reduces consumption of power, leading to reducing the negative environmental impact from energy usage. Additionally, in a high-performance computation environment with fixed hardware or in cloud environments, saved computational resources can be utilized for other applications. Furthermore, since not all executions of the predictive simulator program 114 may provide equal contributions in the resulting distributions, intelligent execution may identify specific models (i.e., iterations of the predictive simulator program 114) that would provide a benefit for a current prediction time period, and specific models that would not provide a benefit for the current prediction time period.

In the depicted embodiment, the ML model trainer 116 is a standalone software program. In another embodiment, the functionality of the ML model trainer 116, or any combination programs thereof, may be integrated into an additional software programs. In some embodiments, the ML model trainer 116 may be located on several separate computing devices (not depicted) but can still communicate over the network 110. In various embodiments, client versions of the ML model trainer 116 may reside on any other computing device within the weather modeling environment 100. The ML model trainer 116 is depicted and described in further detail with respect to FIG. 2.

Figure 2:
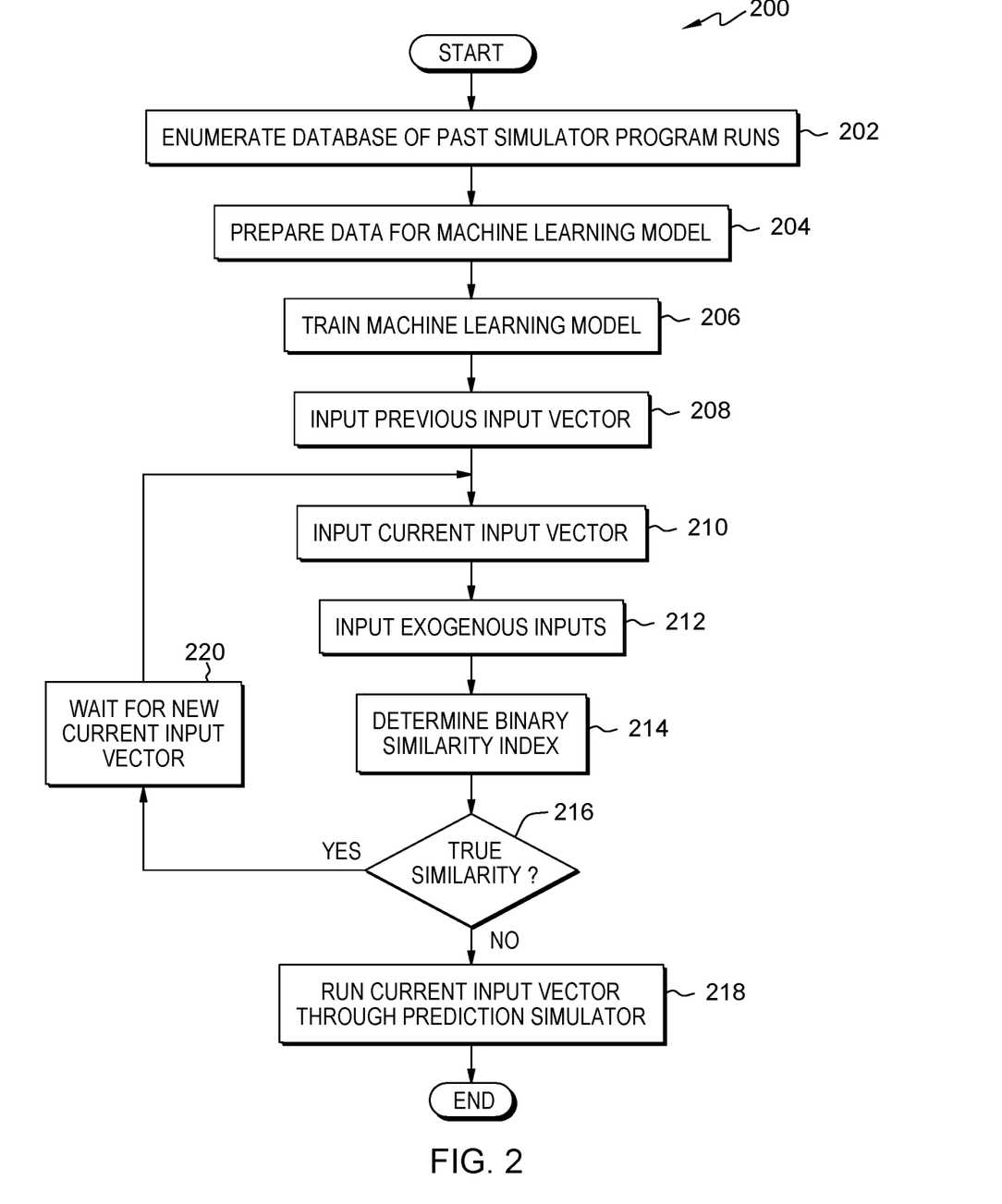
FIG. 2 depicts a flowchart of operational procedures of a machine learning model trainer, in accordance with one embodiment of the present invention.

FIG. 2 depicts operational procedures of the ML model trainer 116, in accordance with one embodiment of the present invention. The ML model trainer 116 may enumerate a database of past runs of the predictive simulator program 114 (block 202). The database may include all or a subset of the corpus 112. The enumeration of the database may be based on specific conditions for training ML models, depending on the desired predictions. The ML model trainer 116 runs a program to train a ML model that intelligently predicts when the predictive simulator program 114 will provide a different prediction than the previous prediction. If the ML model trainer 116 wants to train a ML model to intelligently predict when the predictive simulator program 114 will predict inclement weather, the database may be enumerated with data containing inclement weather information. For ML models designated for other weather conditions, the ML model trainer 116 may enumerate other subsets of the corpus as the database.

The ML model trainer 116 may then prepare the enumerated database with pairs for training the ML model (block 204). The ML model trainer 116 organizes the enumerated database into pairs: a first field of inputs and a second field of outputs. The first field includes initial conditions, boundary conditions, dynamic fields, fixed fields, and computed output fields such as precipitation, wind, temperature, etc. The data of the first field has previously been fed into the predictive simulator program 114 (or any other predictive simulator or prediction model) in the past, and the output from the predictive simulator program 114 is the second field. These input-output pairs (i.e., archived forecasts and/or hindcasts) may be organized based on seasonality, topography, or any other hyper-parameter-specific partition of data. This organization and differentiation of data input leads to predictive simulator programs with different models and different prediction capabilities. The inputs and outputs may be supplemented with observations that can be used to subset the model runs based on output accuracy (i.e., the ML model trainer may keep the model runs which provided sufficient accuracy, and discard model runs that are inaccurate).

The inputs and outputs of the predictive simulator program 114 created from previous model runs are further organized into triplets. The triplets include a first input $X_i$, a second input $X_j$, and a binary similarity index $S_{ij}$ indicating whether the two model runs $\{X_i, Y_i\}$ and $\{X_j, Y_j\}$ are similar or not. The similarity index $S_{ij}$ includes one of two options (e.g., True/False, 1/0, Yes/No) for similarity between the model runs. In certain embodiments, the similarity index may include two components: model similarity and user similarity. Model similarity is determined from unsupervised learning.

Figure 3:
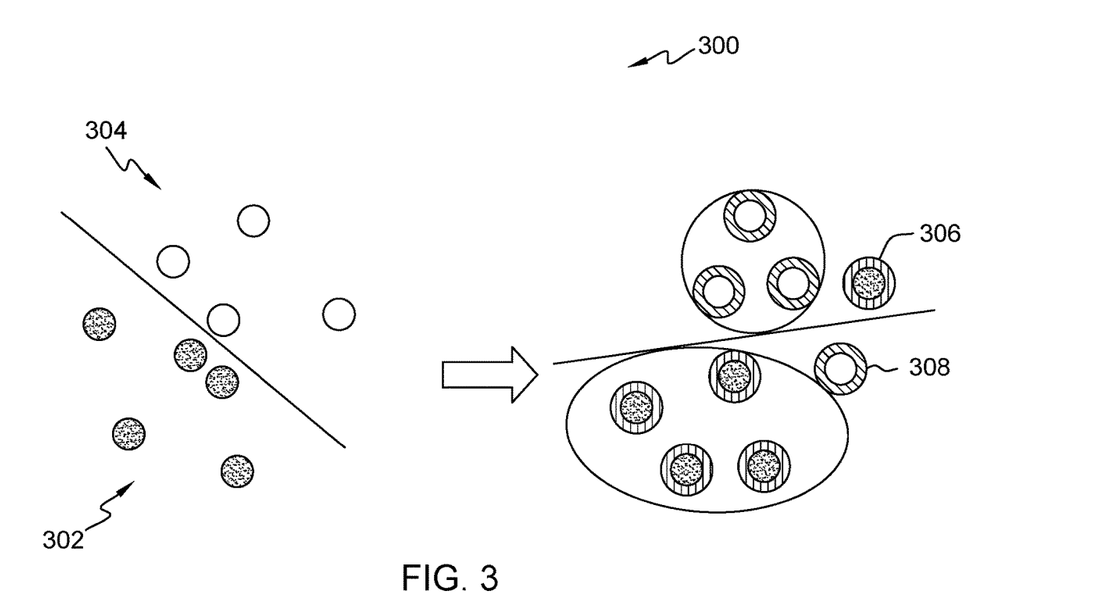
FIG. 3 depicts a procedure utilizing unsupervised learning to determine model similarity, in accordance with one embodiment of the present invention.

FIG. 3 depicts a procedure utilizing unsupervised learning to determine model similarity, in accordance with one embodiment of the present invention. The data may be prepared using any machine learning method, but FIG. 3 illustrates a clustering method. In a first step, the unsupervised learning determines clustering of a first group of model inputs 302 and a second group of model inputs 304. The clustering algorithm separates the first group 302 from the second group 304 based on any clustering method. Once the individual inputs for first group 302 and the second group 304 are determined and recorded, the clustering algorithm is run again on the inputs plus the outputs. The unsupervised learning separates the concatenated inputs and outputs into two groups again. Any individual data point that switches from the first group 302 to the second group 304, or from the second group 304 to the first group 302 indicates a model dis-similarity. In the illustrated embodiment a first switched data point 306 switched from the first group 302 to the second group 304, and a second switched data point 308 switched from the second group 304 to the first group 302. The first switched data point 306 and the second switched data point 308 indicated model dis-similarity, while the remaining data points in the first group 302 and the second group 304 indicate model similarity.

The similarity index $S_{ij}$ is also dependent on user similarity. The user similarity value is included in the similarity index $S_{ij}$ to take into account a user preference. For example, if a predicted precipitation is lower than a threshold that matters for the user, the current model execution would not predict conditions. The similarity index $S_{ij}$ is true if both the model similarity and the user similarity components are true. In a simplest approach, if the relative distances $d(Y_{ij})$/length $(Y_i)$ and/or $d(X_{ij})$/length$(X_i)$ are greater than user defined thresholds, then $S_{ij}$=TRUE.

The ML model trainer 116 may then train the ML model with the prepared data (block 206). The ML model trainer 116 may train the ML model through ML training methods, and may utilize any type of ML model. For training, the ML model trainer 116 may feed the triplets into the ML model and iteratively improve the weights or parameters of the ML model (e.g., through backpropagation) until an acceptable level of accuracy is achieved on the test data set. The ML model trainer 116 may repeat the training of the ML model (e.g., every day, week, month) as new data points are collected and/or stored on the corpus 112. In certain embodiments, the ML model trainer 116 only trains the ML model once, and then the ML model is used without update.

The ML model trainer 116 may then use the trained ML model by inputting a previous input vector in the ML model (block 208) and inputting a current input vector in the ML model (block 210). The previous input vector and current input vector do not include the output results of the predictive simulator program 114, but merely the inputs that would be fed into the predictive simulator program 114. The ML model trainer 116 may also input exogenous inputs (block 212). The exogenous inputs may include information such as user preferences, specific events, season, or other data that are not included in the input vectors, but that may be useful in determining whether to execute the predictive simulator program 114. In certain embodiments, the ML model trainer 116 does not input exogenous inputs, but instead determines a similarity index based solely on the previous input vector and current input vector.

Once all the inputs (i.e., previous input vector, current input vector, exogenous inputs) are input into the ML model trainer 116, the ML model trainer 116 determines a binary similarity index (block 214). The binary similarity index is based on the previous input vector and the current input vector, and indicates an output from two options for whether the previous input vector will provide similar results from the predictive simulator program 114 that would be produced from the current input vector. The ML model trainer 116 then determines whether the similarity index indicates a true similarity (block 216). If the similarity index does not indicate a true similarity (block 216, No), then the current input vector will provide a useful new simulation, and the ML model trainer 116 will run the current input vector through the predictive simulator program 114 (block 218). If the similarity index does indicate a true similarity (block 216, Yes) then the ML model trainer 116 will not run the current input vector through the predictive simulator program 114, and instead waits, and then receives a new current input vector (block 220). The former current input vector may then be changed to the previous input vector, with the process (i.e., blocks 210, 212, 214, and 216) repeating until a true similarity is not found.

Figure 4:
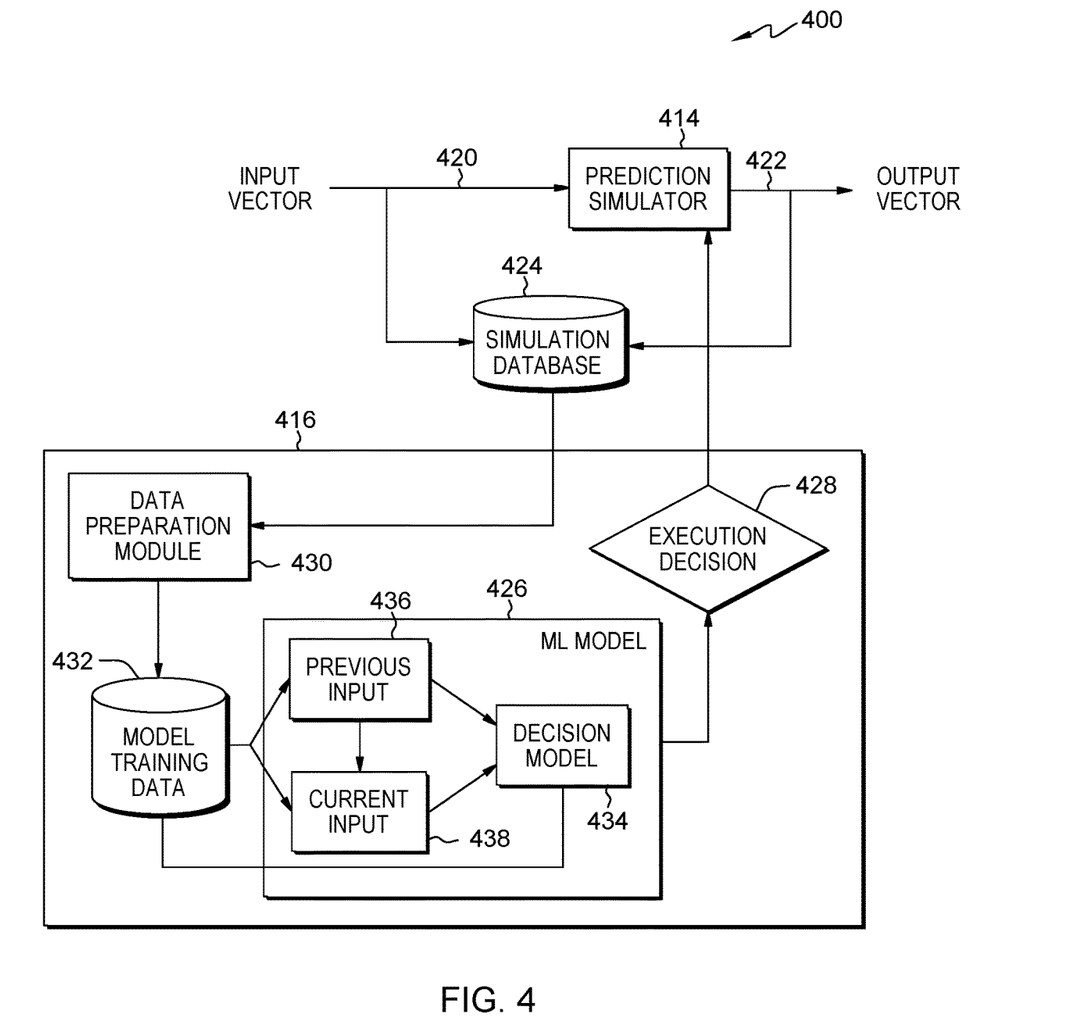
FIG. 4 depicts a weather modeling environment showing component interactions, in accordance with one embodiment of the present invention.

FIG. 4 depicts a weather modeling environment 400 showing component interactions, in accordance with one embodiment of the present invention. The weather modeling environment 400 includes a predictive simulator program 414 and a ML model trainer 416. The predictive simulator program 414 operates in a manner described above and, in certain embodiments, continuously receives input vectors 420 and continuously outputs results 422 as the new input vectors 420 become available. The input vectors 420 and the results 422 may also be continuously stored in a simulation database 424 (which may be stored in the corpus 112 in the embodiment of FIG. 1). The ML model trainer 416 may interrupt continuous operation of the predictive simulator program 414, however, by training a ML model 426 to output a similarity index. An execution decision 428 converts the similarity index into a command for the predictive simulator program 414 to execute/not execute for a given input vector 420.

The ML model trainer 416 may include a data preparation module 430 to prepare the data from the simulation database 424 as described above. That is, the data preparation module 430 may organize the input vectors 420 into triplets for training the ML model 426 during a ML model training stage. The prepared triplets include two input vectors and a pre-determined binary similarity index, and may be stored in a model training database 432 (the model training database 432 may also be part of the corpus 112 described in relation to FIG. 1). During training, the prepared triplets are fed into a decision model 434 of the ML model 426. The decision model 434 updates weights until a sufficient accuracy for outputting similarity indexes is reached.

Once the ML model trainer 416 completes training for the ML model 426 and the decision model 434, the simulation database 424 may input a previous input 436 and a current input 438 into the decision model 434 to determine a similarity index 440 for running the predictive simulator program 414. The similarity index 440 may be customized by exogenous information 442 added to the execution decision 428 as described above. If the similarity index is true, the predictive simulator program 414 will execute the prediction simulation with the current input vector, and if the similarity index is false, the predictive simulator program 414 will not execute the prediction simulation with the current input vector.

Figure 5:
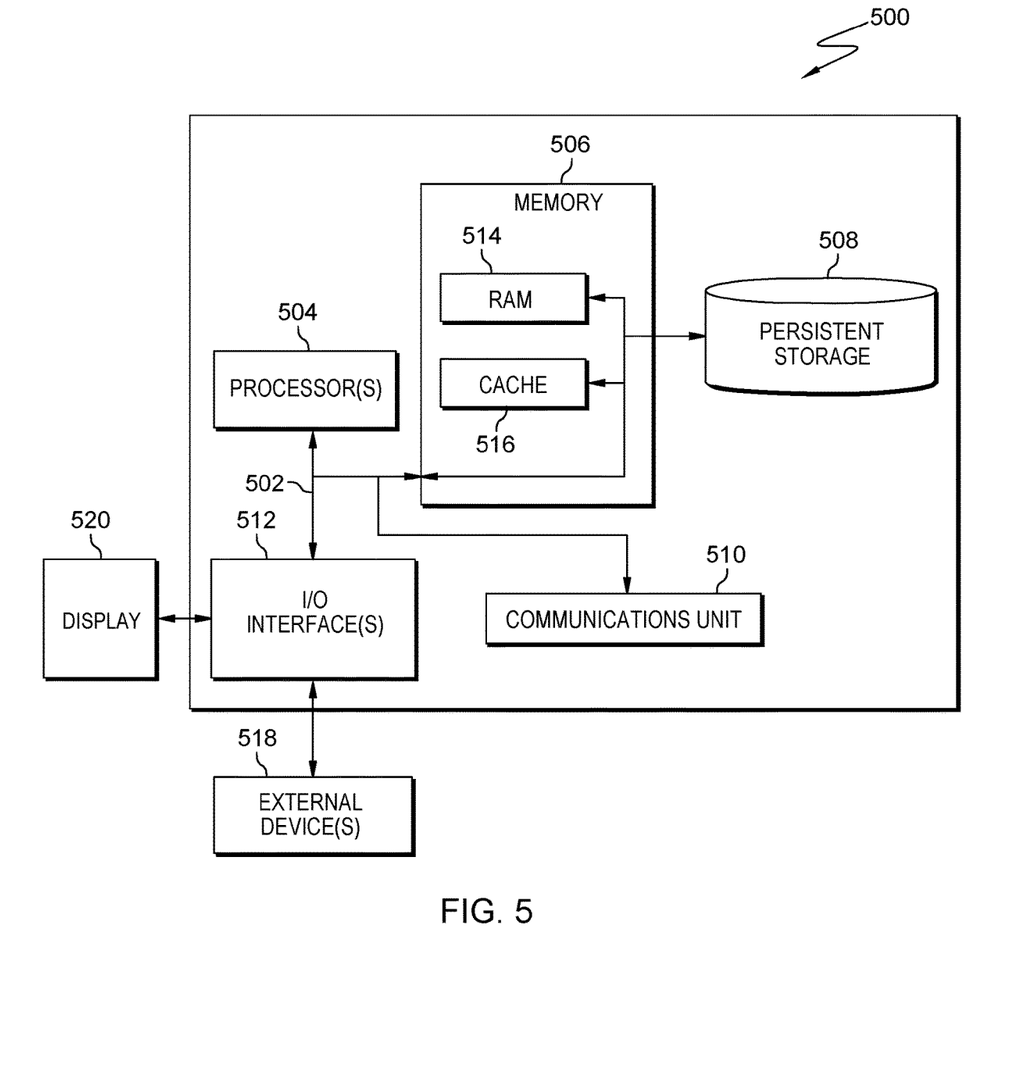
FIG. 5 depicts a block diagram of components of a computing device in accordance with an illustrative embodiment of the present invention.

FIG. 5 depicts a block diagram of components of a computing device 500 in accordance with an illustrative embodiment of the present invention. As described above, the computing device 500 may represent any of the devices (e.g., data collection device 102, network storage device 104, computing device 106, or client device 108) described above, or a combination of the devices, in the embodiments where the devices are embodied as components of a single computing device 500. It should be appreciated that FIG. 5 provides only an illustration of one implementation and does not imply any limitations with regard to the environments in which different embodiments may be implemented. Many modifications to the depicted environment may be made.

The computing device 500 includes communications fabric 502, which provides communications between RAM 514, cache 516, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses or a crossbar switch.

Memory 506 and persistent storage 508 are computer readable storage media. In this embodiment, memory 506 includes random access memory (RAM). In general, memory 506 can include any suitable volatile or non-volatile computer readable storage media. Cache 516 is a fast memory that enhances the performance of computer processor(s) 504 by holding recently accessed data, and data near accessed data, from memory 506.

The software components (e.g., predictive simulator program 114, 414 or ML model 116/416) may be stored in persistent storage 508 and in memory 506 for execution and/or access by one or more of the respective computer processors 504 via cache 516. In an embodiment, persistent storage 508 includes a magnetic hard disk drive. Alternatively, or in addition to a magnetic hard disk drive, persistent storage 508 can include a solid state drive, a semiconductor storage device, read-only memory (ROM), erasable programmable read-only memory (EPROM), flash memory, or any other computer readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer readable storage medium that is also part of persistent storage 508.

Communications unit 510, in these examples, provides for communications with other data processing systems or devices. In these examples, communications unit 510 includes one or more network interface cards. Communications unit 510 may provide communications through the use of either or both physical and wireless communications links. The proxy, application, access manager, collection page, authentication tool, or multi-factor authentication page may be downloaded to persistent storage 508 through communications unit 510.

I/O interface(s) 512 allows for input and output of data with other devices that may be connected to the computing device 500. For example, I/O interface 512 may provide a connection to external devices 518 such as a keyboard, keypad, a touch screen, and/or some other suitable input device. External devices 518 can also include portable computer readable storage media such as, for example, thumb drives, portable optical or magnetic disks, and memory cards. Software and data used to practice embodiments of the present invention (e.g., predictive simulator program 114, 414 or ML model 116/416) can be stored on such portable computer readable storage media and can be loaded onto persistent storage 508 via I/O interface(s) 512. I/O interface(s) 512 also connect to a display 520.

Display 520 provides a mechanism to display data to a user and may be, for example, a computer monitor.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for intelligently executing predictive simulator, comprising:
   inputting, by one or more processors, a previous input vector into a machine-learning (ML) model, wherein the previous input vector comprises first conditions for producing a first output from a predictive simulator for a first time;
   inputting a current input vector into the ML model, wherein the current input vector comprises second conditions for producing a second output from the predictive simulator for a second time;
   determining, using the ML model, a binary similarity index, wherein the binary similarity index represents a prediction of similarity between the first output and the second output.

2. The computer-implemented method of claim 1, further comprising inputting exogeneous inputs, wherein the exogenous inputs comprise a selection from the group consisting of: location-based metrics, outputs of the predictive simulator, and use metrics of the predictive simulator.

3. The computer-implemented method of claim 1, wherein the current input vector comprises a selection from the group consisting of: initial conditions, boundary conditions, dynamic fields, fixed fields, and observed environmental conditions such as precipitation, wind, and temperature.

4. The computer-implemented method of claim 1, wherein the previous input vector comprises a selection from the group consisting of: initial conditions, boundary conditions, dynamic fields, fixed fields, and observed environmental conditions such as precipitation, wind, and temperature.

5. The computer-implemented method of claim 1, wherein the binary similarity index comprises:
   a user similarity component comprising a forecasting requirement of a user; and
   a model similarity component comprising a clustering of the previous input vector and the current input vector.

6. The computer-implemented method of claim 1, further comprising running the current input vector through the predictive simulator only if the binary similarity index indicates a TRUE similarity.

7. The computer-implemented method of claim 1, further comprising training the ML model, wherein training the ML model comprises inputting pairs comprising: (i) inputs to the predictive simulator and (ii) resulting outputs from the predictive simulator.

8. The computer-implemented method of claim 7, wherein the pairs of inputs are input based on a selection from the group consisting of: seasonality, topography, and other hyper-parameter-specific partition.

9. A computer program product for training temporal precipitation interpolation models, comprising:
one or more computer readable storage media, and program instructions collectively stored on the one or more computer readable storage media, the program instructions comprising:
program instructions to input a previous input vector into a machine-learning (ML) model, wherein the previous input vector comprises first conditions for producing a first result from a predictive simulator for a first time;
program instructions to input a current input vector into the ML model, wherein the current input vector comprises second conditions for producing a second result from the predictive simulator for a second time;
program instructions to determine, using the ML model, a binary similarity index, wherein the binary similarity index represents a prediction of similarity between the first output and the second output.

10. The computer program product of claim 9, further comprising program instructions to input exogeneous inputs, wherein the exogeneous inputs comprise a selection from the group consisting of: location-based metrics, outputs of the predictive simulator, and use metrics of the predictive simulator.

11. The computer program product of claim 9, wherein the current input vector comprises a selection from the group consisting of: initial conditions, boundary conditions, dynamic fields, fixed fields, and observed environmental conditions such as precipitation, wind, and temperature.

12. The computer program product of claim 9, wherein the previous input vector comprises a selection from the group consisting of: initial conditions, boundary conditions, dynamic fields, fixed fields, and observed environmental conditions such as precipitation, wind, and temperature.

13. The computer program product of claim 9, wherein the binary similarity index comprises:
a user similarity component comprising a forecasting requirement of a user; and
a model similarity component comprising a clustering of the previous input vector and the current input vector.

14. The computer program product of claim 9, further comprising program instructions to run the current input vector through the predictive simulator only if the binary similarity index indicates a TRUE similarity.

15. The computer program product of claim 9, further comprising program instructions to train the ML model, wherein training the ML model comprises inputting pairs comprising: (i) inputs to the predictive simulator and (ii) resulting outputs from the predictive simulator.

16. The computer program product of claim 15, wherein the pairs of inputs are input based on a selection from the group consisting of: seasonality, topography, and other hyper-parameter-specific partition.

17. A computer system for training temporal precipitation interpolation models, comprising:
one or more computer processors, one or more computer readable storage media, and program instructions collectively stored on the one or more computer readable storage media for execution by at least one of the one or more computer processors, the program instructions comprising:
program instructions to input a previous input vector into a machine-learning (ML) model, wherein the previous input vector comprises first conditions for producing a first result from a predictive simulator for a first time;
program instructions to input a current input vector into the ML model, wherein the current input vector comprises second conditions for producing a second result from the predictive simulator for a second time;
program instructions to determine, using the ML model, a binary similarity index, wherein the binary similarity index represents a prediction of similarity between the first output and the second output.

18. The computer system of claim 17, further comprising program instructions to input exogeneous inputs, wherein the exogeneous inputs comprise a selection from the group consisting of: location-based metrics, outputs of the predictive simulator, and use metrics of the predictive simulator.

19. The computer system of claim 17, further comprising program instructions to run the current input vector through the predictive simulator only if the binary similarity index indicates a TRUE similarity.

20. The computer system of claim 17, wherein the binary similarity index comprises:
a user similarity component comprising a forecasting requirement of a user; and
a model similarity component comprising a clustering of the previous input vector and the current input vector.

* * * * *